Jan. 22, 1929.
H. JENNINGS
HOSE COUPLING
Filed Nov. 15, 1924
1,699,591
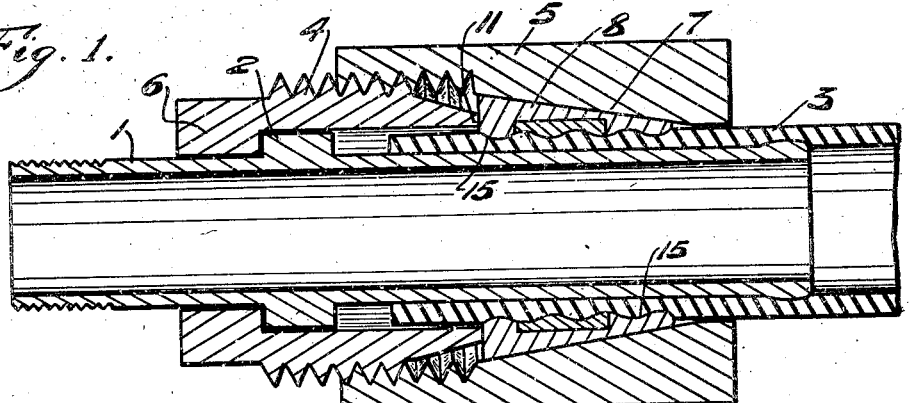
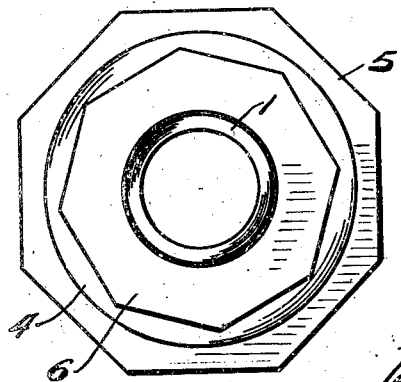
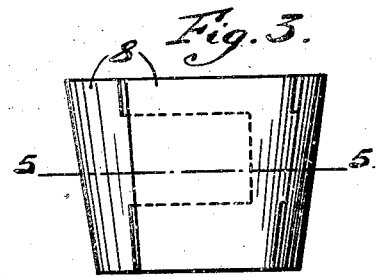
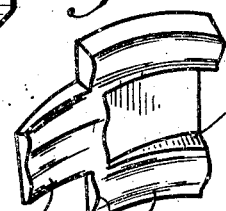
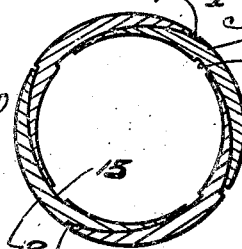
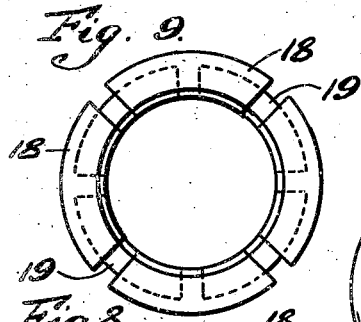
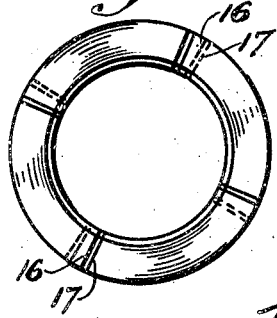
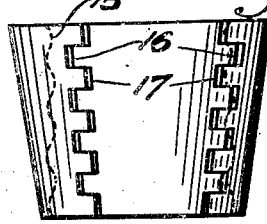
Inventor
Herbert Jennings
By Binas Hostetler
Attorney Patented Jan. 22, 1929.

1,699,591

UNITED STATES PATENT OFFICE.

HERBERT JENNINGS, OF HOLDENVILLE, OKLAHOMA.

HOSE COUPLING.

Application filed November 15, 1924. Serial No. 750,102.

It is well known among the users of high pressure hose that there is need of a clamp to couple the said hose to the tubing or piping in such a manner as to positively prevent any leaking and yet avoid any cutting of the hose. There has been heretofore the difficulty of obtaining in one coupling the essential qualities of holding fast the hose to the piping without any possibility of cutting the hose and without permitting any escape of the fluid.

The object of the present invention is to combine in one coupling such a device that will be simple in structure, cheap in manufacture and efficient in operation and yet possess all the qualities above enumerated.

The above object is accomplished by providing a plurality of wedge segments which are arranged to encircle the entire circumference of the hose and break joints in such a manner that the hose will be gripped equally at all points around its circumference and for a considerable length to procure a firm and equalizing grip. Were not the grip equalized upon the hose, there would be a tendency for the segments to cut the hose at the edges and cause it to burst when under heavy pressure.

With the above objects in view and others which will be made more apparent as the description proceeds, the invention will now be more specifically set forth reference being had to the accompanying drawing which forms a part of this application and in which—

Figure 1 is a sectional view of the coupling secured to the piping and hose.

Figure 2 is an end view of Figure 1 looking to the right.

Figure 3 is a vertical view of the wedge segments.

Figure 4 is an enlarged view of one of the wedge segments.

Figure 5 is a sectional view thru lines 5—5 of Figure 3.

Figure 6 is another modified form of segments showing a series of engaging tongues and grooves thereon.

Figure 7 is an end view of Figure 6.

Figure 8 is still another modified form of the wedge segments.

Figure 9 is an end view of Figure 8.

Referring now more specifically to the drawings wherein corresponding numerals are used to designate similar parts in the different views, the tube 1 having a flange 2 thereon is screw threaded or otherwise equipped for attaching it to another section. The tubing is of considerable length in order to fit within the hose 3. After the end of the hose has been slipped over the end of the tubing in the manner shown, the coupling can then be put in place.

This coupling member comprises the two sections 4 and 5 which are constructed so that the members can be adjusted relatively to each other. In the present instance screw threads are formed on each of the members but any other well known means could be substituted therefor. The member 4 has on one end an annular flange 6 having a cylindrical bore of a slightly greater diameter than the piping but considerably less than the diameter of the flange on the pipe. Except for the flange, this coupling member is bored to slide over the flange on the pipe until both of the flanges are brought into engagement with each other. The other coupling member 5 which will be later referred to as the second coupling member is bored to form an interior tapering surface 7 intermediate the ends for a purpose later to be described. One of the ends is formed to engage with the first coupling member while the other end is bored to fit closely over the hose.

Within the coupling member 5 is placed the ring made up of the plurality of separate and detachable wedge segments 8. Each segment is formed with a tongue 9 and groove 10 on its respective sides arranged in such a manner that the tongue of one segment will interengage with the adjacent groove of adjoining segment when they are assembled in the form of a ring about the hose. It should be noted that a complete ring is obtained and the tongue and groove break joints so that the entire surface of the hose is gripped and clamped with equal pressure against the tube. It is obvious that the interior surface of each segment must be of a circular formation in order to closely grip the tube or in other words to conform to the shape of the tube or hose. This inner surface is also preferably slightly corrugated not only to prevent any slipping of the segments relatively to the hose but to form a series of annular rings 15. These rings formed by the convex portions of the corrugations will exert a greater compression upon the hose than will the concave portions and hence more effectively seal the pipe and hose fitting.

When the segments have been assembled within the second coupling member, the first coupling member will be screwed into it and as soon as the extended end 11 engages the thickened ends of the segments the continued rotation will draw the second coupling member axially and movable relatively to the segments. The first coupling member may advantageously be formed with an octagonal head or otherwise in order to receive a wrench or tool for turning. The coupling members can be adjusted to any extent desired. The segments during this adjustment are equally compressed against the hose and with the overlapping joints there is no possible chance for the hose to expand and lift from the tube when there is pressure in the hose. Neither is there excessive pressure applied to the hose at any one point which would have a tendency to cut the hose beneath the segments or at their respective edges when they are radially compressed.

As is shown very clearly in Figures 3, 4 and 5, the segments 8 with their overlapping edges form practically a complete ring besides being adjustable in such a manner as to reduce to a minimum the possibility of cutting the hose. Each segment is slightly recessed to a depth of about the thickness as the tongue of each adjacent segment. The recesses 10 formed will also be of a corresponding conformation to the tongues 9.

The modification in Figure 6 is quite similar to the segments shown in the preceding figures. These segments, however, are formed with a plurality of tongues 16 and grooves 17 on their respective sides. This form, too, has the advantage that it minimizes the possibility of the hose being cut by the edges of the engaging sections.

The modification in Figure 8 shows a plurality of segmental rings composed of the segments 18 and 19. These rings are composed of the segments radially disposed about the hose and with the ends of the segments in contact with the end of the segments in the other ring but the segments of one ring are arranged so that they will break joints with spaces between the segments of the other ring.

It is to be understood that this disclosure and description are merely for the purpose of illustration and the same combination of parts and arrangement of elements may be applied to other pipes and hose of various shapes and sizes. It is obvious that the invention herein set forth may also be exemplified in numerous other alternative constructions and I accordingly reserve the right of adopting all such legitimate constructions as may fairly be embodied within the spirit and scope of the invention as set forth in the annexed claims, and do not limit myself to the precise details of construction and arrangement shown.

Having thus described my invention, what I claim and desire to secure by Letters Patent is:

1. A pipe and hose coupling comprising two sections one of which is interiorly threaded and provided with a tapered bore and the other of which is exteriorly threaded and provided with a cylindrical bore and an inwardly extending flange on one end, an interfitting segmental wedge ring contained entirely within the tapered bore of the interiorly threaded section whereby the entire outer surface of the same will in selected adjustable positions be contacted to equalize the radial pressure on the hose, a separately formed pipe member having a narrow annular flange near one end adapted to slide within the cylindrical bore and fit against the inwardly extending flange of the exteriorly threaded section and provided with a smooth hose contacting surface of uniform diameter which extends a substantial distance beyond each end of the segmental ring to permit uniform axial expansion of the hose, and means projecting beyond the threaded surface of the exteriorly threaded section to provide the sole support for the thickened end of the segmental ring.

2. A pipe and hose coupling comprising complementary tubular elements adapted to be engaged, one of said elements being provided with a tapered bore and the other being provided with a cylindrical bore and an inwardly extending flange on one end, a segmental wedge ring adapted to be entirely contained within the tapered bore of the first tubular element whereby the entire outer surface of the same will in selected adjustable positions be contacted to equalize the radial pressure on the hose, and a pipe element having an annular flange near one end and an intermediate smooth hose contacting surface of uniform diameter adapted to underlie and project beyond the ends of the segmental wedge ring to permit uniform axial expansion of the hose.

In testimony whereof I affix my signature.

HERBERT JENNINGS.